United States Patent
Premkumar et al.

(10) Patent No.: US 11,133,511 B2
(45) Date of Patent: Sep. 28, 2021

(54) METHOD OF PROVIDING A FUNCTIONALLY GRADED COMPOSITE LAYER FOR COEFFICIENT OF THERMAL EXPANSION COMPLIANCE IN SOLID OXIDE FUEL CELL STACKS AND SYSTEM COMPONENTS

(71) Applicant: BLOOM ENERGY CORPORATION, Sunnyvale, CA (US)

(72) Inventors: Mosul K. Premkumar, Mumbai (IN); Vijay Radhakrishnan, Mumbai (IN); Rahul Kulkarni, Mumbai (IN); Padiadpu Shankara Anantha, Mumbai (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 19 days.

(21) Appl. No.: 16/162,841

(22) Filed: Oct. 17, 2018

(65) Prior Publication Data

US 2019/0148740 A1    May 16, 2019

Related U.S. Application Data

(60) Provisional application No. 62/585,056, filed on Nov. 13, 2017.

(51) Int. Cl.
| | |
|---|---|
| H01M 8/0226 | (2016.01) |
| H01M 8/00 | (2016.01) |
| H01M 8/0208 | (2016.01) |
| H01M 8/0271 | (2016.01) |
| H01M 8/0243 | (2016.01) |
| H01M 8/0215 | (2016.01) |
| H01M 8/0228 | (2016.01) |
| H01M 8/2425 | (2016.01) |
| H01M 8/124 | (2016.01) |

(52) U.S. Cl.
CPC ......... *H01M 8/0226* (2013.01); *H01M 8/006* (2013.01); *H01M 8/0208* (2013.01); *H01M 8/0215* (2013.01); *H01M 8/0228* (2013.01); *H01M 8/0243* (2013.01); *H01M 8/0271* (2013.01); *H01M 8/2425* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 6,194,083 B1 * | 2/2001 | Yasuda | C04B 35/488 428/325 |
| 8,580,456 B2 | 11/2013 | Armstrong et al. | |
| 8,748,056 B2 | 6/2014 | Batawi et al. | |
| 8,852,825 B2 | 10/2014 | Batawi et al. | |
| 9,214,679 B2 | 12/2015 | Nguyen et al. | |
| 9,452,475 B2 | 9/2016 | Armstrong et al. | |
| 9,468,736 B2 | 10/2016 | Darga et al. | |
| 9,634,335 B2 | 4/2017 | Ashary | |

(Continued)

*Primary Examiner* — Carmen V Lyles-Irving
(74) *Attorney, Agent, or Firm* — The Marbury Law Group PLLC

(57) ABSTRACT

A buffer layer between an interconnect and an electrolyte of a solid oxide fuel cell, the buffer layer having a gradient in coefficient of thermal expansion (CTE), wherein the buffer layer minimizes electrolyte damage due to a difference in CTE between the interconnect and electrolyte.

3 Claims, 5 Drawing Sheets

(56) References Cited

U.S. PATENT DOCUMENTS

| | | |
|---|---|---|
| 9,923,211 B2 | 3/2018 | Batawi et al. |
| 2008/0096080 A1 | 4/2008 | Batawi et al. |
| 2010/0129693 A1 | 5/2010 | Nguyen et al. |
| 2010/0291468 A1* | 11/2010 | Kuo .................... H01M 8/0215 429/483 |
| 2013/0130146 A1 | 5/2013 | Batawi et al. |
| 2013/0230792 A1 | 9/2013 | Wilson et al. |
| 2015/0147679 A1 | 5/2015 | Darga et al. |
| 2015/0194682 A1 | 7/2015 | Ashary |
| 2015/0311538 A1 | 10/2015 | Batawi et al. |
| 2016/0322663 A1* | 11/2016 | Armstrong .............. C04B 35/48 |
| 2018/0248202 A1 | 8/2018 | Khurana et al. |

* cited by examiner

METHOD OF PROVIDING A FUNCTIONALLY GRADED COMPOSITE LAYER FOR COEFFICIENT OF THERMAL EXPANSION COMPLIANCE IN SOLID OXIDE FUEL CELL STACKS AND SYSTEM COMPONENTS

FIELD

The present invention is generally directed to fuel cell components and specifically directed to a functionally graded composite layer for coefficient of thermal expansion compliance in solid oxide fuel cell stacks and system components.

BACKGROUND

Solid oxide fuel cell (SOFC) stack and system sub-assemblies consist of metal and ceramic functional elements. One requisite in these assemblies is to match the coefficient of thermal expansion (CTE) of individual elements. If this factor is not addressed it can lead to residual stress at the interface and eventually component failure. Cracking of electrolytes in SOFC stacks is one of the most common and severe example of failure due to mismatch in CTE. This failure mode is typical in SOFC stacks which employ rigid bonded glass seals which cannot deform below the glass transition temperature (Tg) to accommodate stresses at the interface due to CTE difference between interconnect and electrolyte.

SUMMARY

An embodiment is drawn to a buffer layer between an interconnect and an electrolyte of a solid oxide fuel cell, the buffer layer having a gradient in coefficient of thermal expansion (CTE).

Another embodiment is drawn to a stack of solid oxide fuel cells comprising interconnects between adjacent solid oxide fuel cells, wherein the interconnects comprise a buffer layer between an interconnect and an electrolyte of a solid oxide fuel cell, the buffer layer having a gradient in coefficient of thermal expansion (CTE).

Another embodiment is drawn to a method of making a solid oxide fuel cell interconnect including coating the interconnect with a buffer layer, the buffer layer having a gradient in coefficient of thermal expansion (CTE).

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments relate to coatings for components of fuel cell systems, such as interconnects for a fuel cell stack. Without wishing to be bound to any particular theory, the inventors believe that having a buffer layer with specific characteristics between the interconnect and the electrolyte can minimize electrolyte damage due to difference in CTE. This buffer layer should have following traits:

a. a gradient in CTE which can bridge CTE of electrolyte or ceramic component on one side and interconnect or metallic component on the other side; and b. should be configured correctly to address constraints arising from electrolyte or ceramic component and interconnect or metallic component design.

Figure 1A:
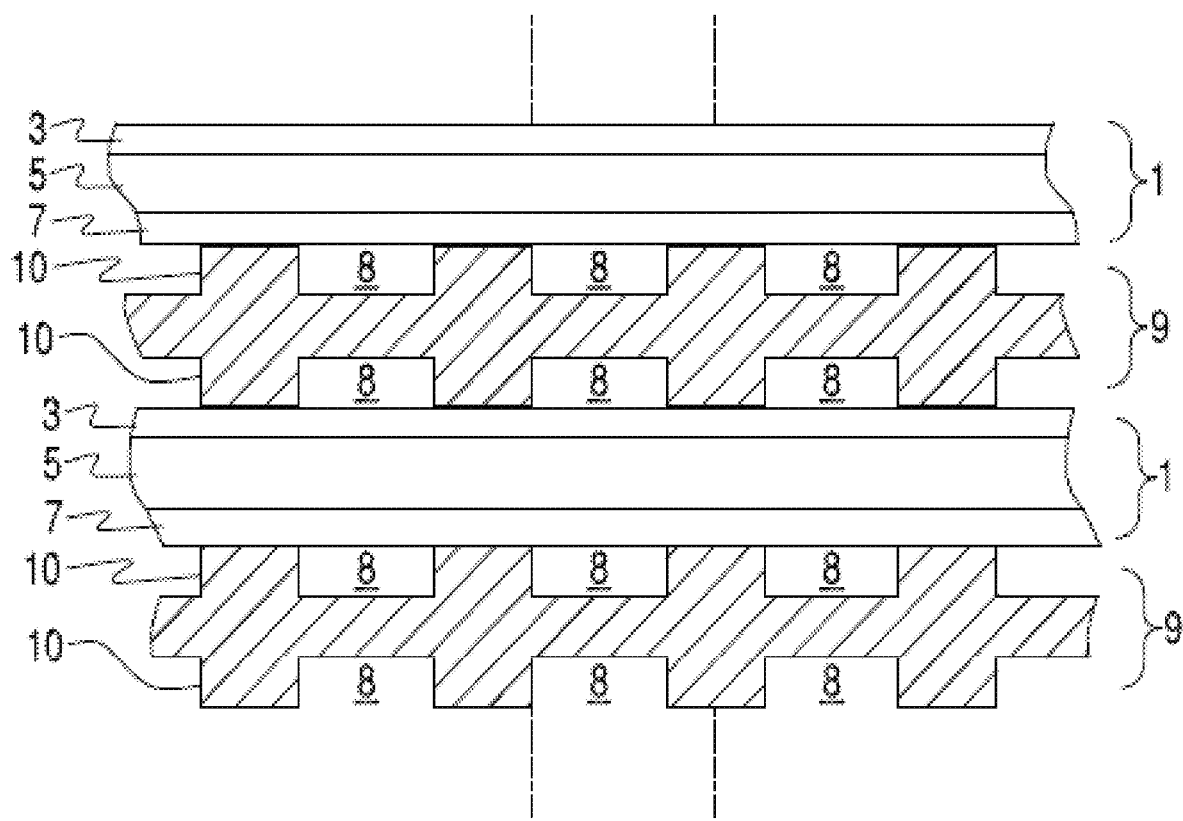
FIG. 1A illustrates a side cross-sectional view of a SOFC stack.

FIG. 1A illustrates a SOFC stack in which each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. FIG. 1A shows that the lower SOFC 1 is located between two interconnects 9.

Figure 1B:
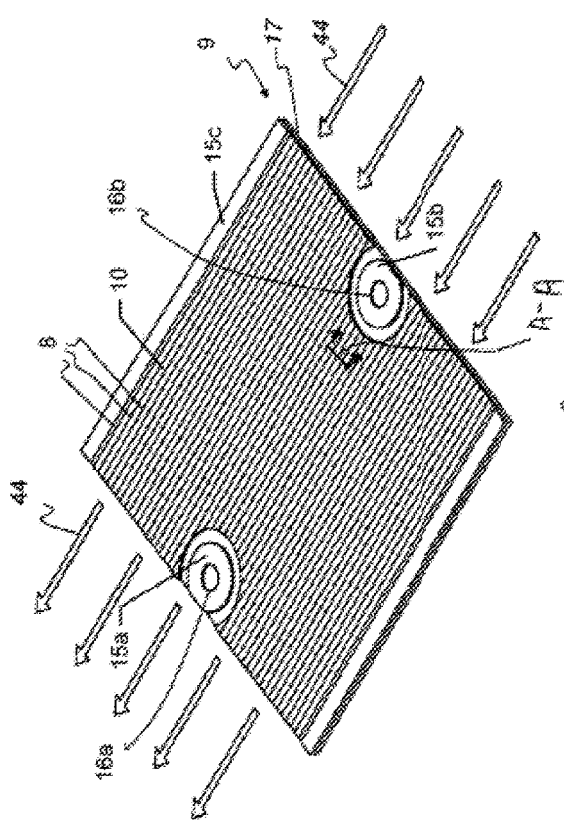
FIGS. 1B and 1C show, respectively, top and bottom views of an interconnect for a SOFC stack.
Figure 1C:
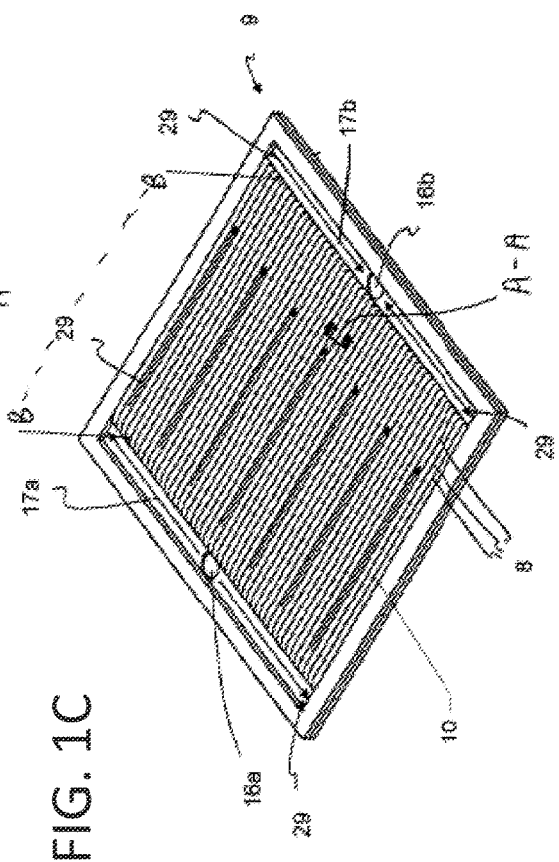

FIGS. 1B and 1C show, respectively, top and bottom views of an interconnect 9. The portions of interconnect 9 shown in side cross-section in FIG. 1A are provided along lines A-A in FIGS. 1B and 1C. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 1C, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 1B, can include gas flow passages or channels 8 between ribs 10 which direct air flow 44 over the cathode electrode of the fuel cell. Seals 15a, 15b can seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b can include a elevated top surface for contacting against the flat surface of the adjacent SOFC 1. A peripheral seal 15c can seal the anode-sides of the interconnect and fuel cell to prevent air from reaching the anode electrode of the fuel cell.

An interconnect 9 may be a chromium-based alloy such as 4-6 wt % Fe and 94-96 wt % Cr, with optionally less than about 1 wt % of Y and unavoidable impurities, and may be formed using a powder metallurgy technique. Alternatively, the interconnect 9 may be made of a stainless steel, such as SS 446 which includes: 23-27 wt % Cr, 0.15-0.2 wt % C, 0.25 wt % Ni, 1.5 wt % Mn, 1.0 wt % Si, 0.04 wt % P, 0.03 wt % S, balance Fe, or other commercial alloys such as Hitachi ZMG 232L™, ATI E-Brite™ or any commercial alloy. A protective coating (e.g., a lanthanum strontium manganite (LSM) perovskite coating and/or manganese cobalt oxide (MCO) spinel coating) may be formed over at least one surface of the interconnect 9, such as over the cathode-facing surface of the interconnect 9.

Figure 2A:
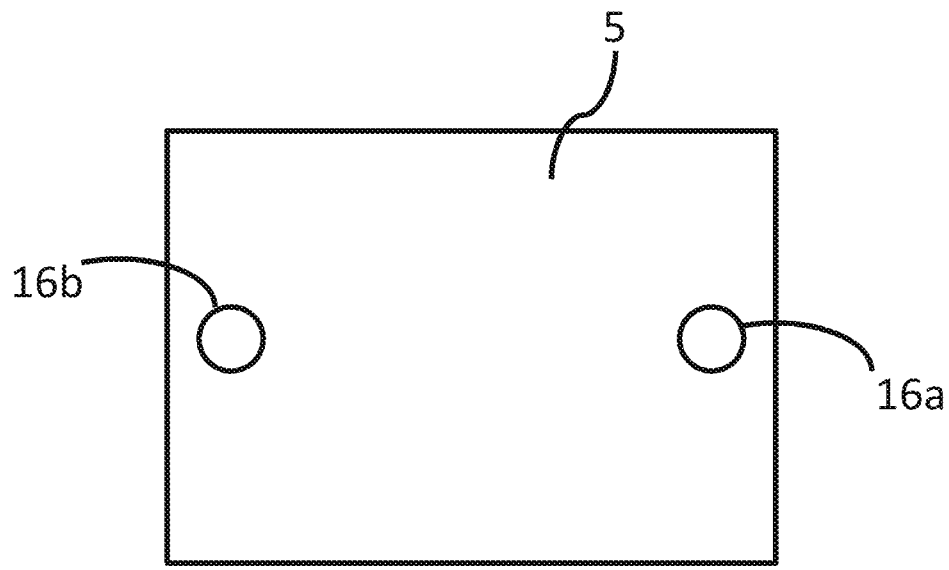
FIG. 2A is a plan view of an electrolyte of a fuel cell.

FIG. 2A is a plan view of a solid oxide electrolyte 5. The electrolyte 5 may comprise a stabilized zirconia, such as scandia stabilized zirconia (SSZ) or yttria stabilized zirconia (YSZ). In an embodiment, the electrolyte 5 may comprise a scandia stabilized zirconia electrolyte composition for a solid oxide fuel cell, comprising a formula $(ZrO_2)_{1-w-x-z}(Sc_2O_3)_w(CeO_2)_x(Yb_2O_3)_z$, where $0.09 \leq w \leq 0.11$; $0.005 < x < 0.015$; $0.0025 \leq z \leq 0.015$, such as w=0.1, x=0.01 and z=0.01. Alternatively, the electrolyte 5 may comprise another ionically conductive material, such as a doped ceria. In this embodiment, the electrolyte 5 has a planar geometry, although it will be understood that other geometries, such as a tubular geometry, could be utilized. Riser channel openings 16a, 16b, which in this embodiment comprise circular holes, extend through the electrolyte 5. The riser channels 16a, 16b generally comprise fuel inlet and outlet openings that extend through at least one layer of the fuel cells. The riser channels 16a, 16b can extend through multiple electrolyte layers 5 and interconnects 9 between the electrolyte layers in a fuel cell stack. Fuel can flow through the inlet riser channel 16a to the anode-side of each fuel cell. There, the fuel flows over the fuel cell anode 3 via gas flow channels 8 formed in the gas flow separator/interconnect plate 9, and then exits through separate outlet riser channel 16b.

Figure 2B:
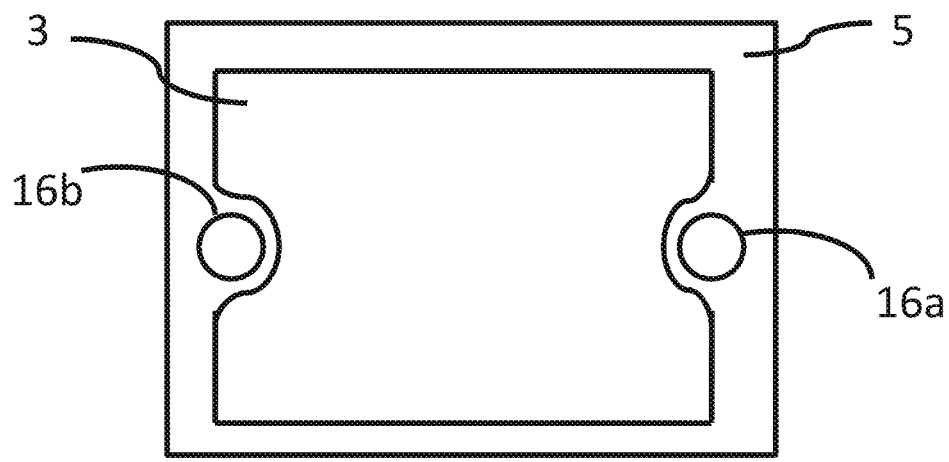
FIG. 2B is a plan view of an electrolyte and an electrode of a fuel cell.

In FIG. 2B, an anode (e.g., fuel) electrode 3 comprising a Ni-coped ceria cermet is shown covering part of a first major surface of the electrolyte 5. A cathode (e.g., air) electrode 7 (not shown) comprising lanthanum strontium manganite (LSM) can cover part of the second major surface on the opposite side of the electrolyte 5.

Controlling the coefficient of thermal expansion (CTE) of a SOFC interconnect is important for high volume manufacturing of fuel cell stacks. Variations in interconnect material properties may produce CTE variations large enough to introduce structural issues during the operation of the stack. A SOFC may have an operating temperature between 750° C. and 950° C., and a SOFC may cycle between ambient temperature and its operating temperature multiple times during its operating life. Thus, thermal effects are significant for SOFC performance. The CTE of the interconnects incorporated into the stack may be controlled to ensure the interconnects have relatively uniform thermal properties, both within each individual interconnect and across all the interconnects of the stack. The interconnects may also be designed to be thermally matched to other components of the stack, such as the adjacent (ceramic) fuel cell electrolytes.

Figure 3A:
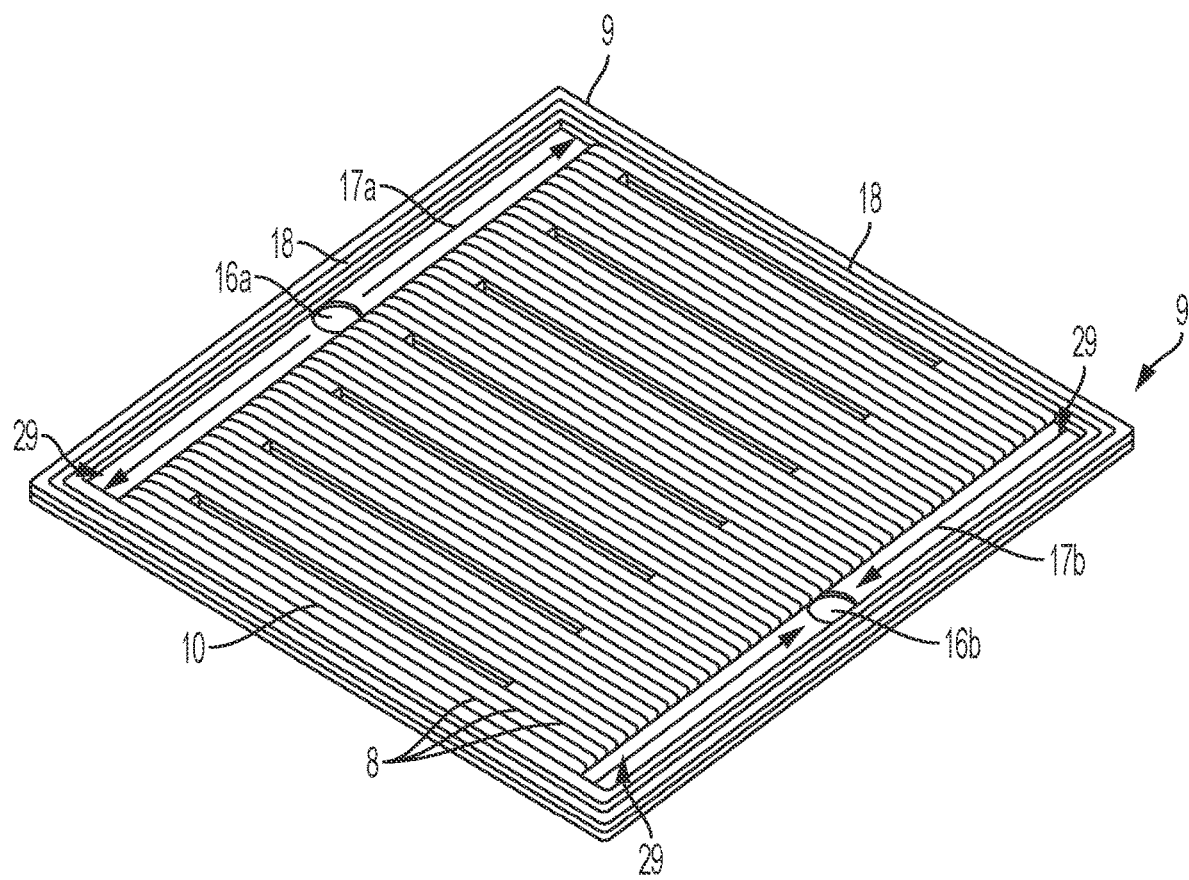
FIGS. 3A and 3B are side cross-sectional views of a coated interconnect according to an embodiment.

In one embodiment, a compliant buffer layer 18 is formed by depositing a functionally graded coating on the interconnect 9. The buffer layer has a in CTE and a gradient in composition in its thickness direction. Multilayered functionally graded coatings with varying fraction of NiCrAlY—YSZ are deposited on stainless steel grade 446 (SS 446) interconnect using a conventional atmospheric plasma spray process. FIG. 3A illustrates the configuration of the coating. In this embodiment, an interconnect 9 is coated along the periphery sealing area as illustrated in FIG. 3A.

Figure 3B:
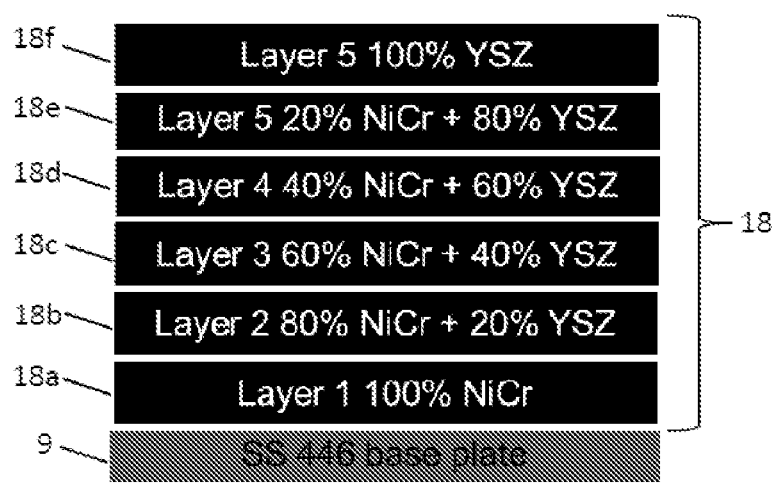

As illustrated in FIG. 3B, the graded buffer layer 18 may have a graded composition in which the amount of metal or metal alloy decreases with distance from the interconnect 9. For example, the graded buffer layer 18 may comprise two or more layers deposited over the interconnect in which the metal or metal alloy amount in each layer closer to the interconnect 9 is higher than the amount of metal or metal alloy in each overlying layer.

For example, the graded buffer layer may comprise a metal or cermet layer 18a comprising a higher metal or metal alloy concentration, such as 90-100 mol % metal or metal alloy and 0-10 mol % ceramic proximal to the interconnect 9, and a ceramic or cermet layer 18f containing a lower metal or metal alloy concentration, such as 0-10 mol % metal or metal alloy and 90-100 mol % ceramic distal from the interconnect (i.e., proximal to the electrolyte 5). Layer 18a comprises a cermet layer if it contains a non-zero amount of ceramic, or a metal or metal alloy layer if it contains no ceramic. Layer 18f comprises a cermet layer if it contains a non-zero amount of separate metal phase (i.e., where the metal is not part of the ceramic oxide), or ceramic if it contains no separate metal phase.

Optionally, the graded buffer layer 18 may also include one or more additional intermediate layers between the bottommost layer 18a and topmost layer 18f in which the amount of metal or metal alloy in each underlying layer is greater than in each overlying layer. For example, the intermediate layers may include layer 18b which contains 80-90 mol % metal or metal alloy and 10-20 mol % ceramic, layer 18c which contains 60-80 mol % metal or metal alloy and 20-40 mol % ceramic, layer 18d which contains 40-60 mol % metal or metal alloy and 40-60 mol % ceramic, and/or layer 18e which contains 20-40 mol % metal or metal alloy and 60-80 mol % ceramic, respectively. As illustrated in FIG. 3B, the graded buffer layer 18 includes 6 layers. However, the graded buffer layer 18 may have more or fewer layers, such as 2, 3, 4, 5, 7, 8, 9, or more layers. In an embodiment, the concentration of the buffer layer is continuously or stepwise graded in a direction perpendicular to the surface of the gas flow separator plate/interconnect 9.

Embodiments include a buffer layer between an interconnect and an electrolyte of a solid oxide fuel cell, a solid oxide fuel cell stack and a method of making a solid oxide fuel cell interconnect in which the buffer layer has a gradient in composition and coefficient of thermal expansion (CTE) between the interconnect 9 and the electrolyte 5. In an embodiment, the buffer layer minimizes electrolyte damage due to a difference in CTE between the interconnect and electrolyte. In an embodiment, the buffer layer comprises 90-100 mol % metal or metal alloy and 0-10 mol % ceramic proximal to the interconnect 9 and 0-10 mol % metal or metal alloy and 90-100 mol % ceramic proximal to the electrolyte 5.

In an embodiment, the metal or metal alloy comprises NiCrAlY, FeCrAlY or another suitable metal or metal alloy. The NiCrAlY alloy may include from 5 to 95 wt % Ni and from 95 to 5 wt % Cr, such as 50 wt % Ni and 50 wt % Cr.

The FeCrAlY alloy may include from 5 to 95 wt % Fe and from 95 to 5 wt % Cr, such as 50 wt % Fe and 50 wt % Cr.

In an embodiment, the ceramic comprises scandia stabilized zirconia (SSZ) or yttria stabilized zirconia (YSZ). In an embodiment, the SSZ can further include ceria and ytterbia to have a formula $(ZrO_2)_{1-w-x-z}(Sc_2O_3)_w(CeO_2)_x(Yb_2O_3)_z$, where $0.09 \leq w \leq 0.11$; $0.005 < x \leq 0.015$; $0.0025 \leq z \leq 0.015$, such as $w=0.1$, $x=0.01$ and $z=0.01$. In embodiment, the interconnect 9 comprises a Cr—Fe alloy having 4-6 wt % Fe and 94-96 wt % Cr, or a stainless steel, such as SS 446.

The graded buffer layer 18 may provide one or more of the following advantages:

The graded buffer layer 18 reduces the occurrence of electrolyte cracks after stack manufacturing and due to temperature transients in the field and hence can result in more robust SOFC stacks.

The graded buffer layer 18 broadens the interconnect manufacturing specification, thereby reducing cost.

Interconnects can be refurbished and then reused with different systems. With the use of the graded buffer layer 18, older interconnects can be used with newer systems using different interconnect CTE specifications, since strict fuel cell to interconnect material CTE is no longer a constraint.

With lesser dependence on CTE constraints, the graded buffer layer allows the use of cost effective alternative interconnect metals and alloys, such as stainless steel, potentially reducing interconnect costs.

The compliant graded buffer layer need not be restricted to SOFC stacks, but can find application in other system sub-assemblies where matching components of dissimilar CTE is of importance. For example, the graded buffer layer may be used in hotbox components where ceramic and metal components need to be attached.

The graded buffer layer with 100% ceramic material as the topmost layer acts as dielectric layer between repeat elements in SOFC stack, thereby reducing stray power loss due to leakage current.

The graded buffer layer may act as a chemical barrier layer which may improve durability of the seal and the electrolyte.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

We claim:

1. A stack of solid oxide fuel cells (SOFCs) comprising:
SOFCs comprising a ceramic electrolyte, an anode and a cathode;
interconnects located between the SOFCs and comprising ribs and channels formed on opposing anode and cathode sides of the interconnects, wherein the channels and the ribs extend from an inlet rise channel to an outlet rise channel; and
a buffer layer coated on each interconnect and having a gradient in coefficient of thermal expansion (CTE),
wherein:
the interconnects comprise a Cr—Fe alloy having 4-6 wt % Fe and 94-96 wt % Cr;
the ceramic electrolyte has a formula $(ZrO_2)_{1-w-x-z}(Sc_2O_3)_w(CeO_2)_x(Yb_2O_3)_z$, where $0.09 \leq w \leq 0.11$; $0.005 < x \leq 0.015$; $0.0025 \leq z \leq 0.015$;
an amount of metal or metal alloy in the buffer layer decreases with increasing distance from the interconnect;
the buffer layer comprises a bottommost layer containing 90-100 mol % metal or metal alloy and 0-10 mol % ceramic located proximal to the interconnect and a topmost layer containing 0-10 mol % metal or metal alloy and 90-100 mol % ceramic located distal from the interconnect;
at least one intermediate layer is located between the bottommost and the topmost layers such that the amount of metal or metal alloy in each underlying layer is greater than in each overlying layer; and
the at least one intermediate layer comprises a first intermediate layer which contains 80-90 mol % metal or metal alloy and 10-20 mol % ceramic, a second intermediate layer which contains 60-80 mol % metal or metal alloy and 20-40 mol % ceramic, a third intermediate layer which contains 40-60 mol % metal or metal alloy and 40-60 mol % ceramic, and a fourth intermediate layer which contains 20-40 mol % metal or metal alloy and 60-80 mol % ceramic.

2. The stack of claim 1, wherein the metal or metal alloy comprises NiCrAlY and the ceramic comprises yttria stabilized zirconia (YSZ).

3. The stack of claim 1, wherein the metal or metal alloy comprises FeCrAlY and the ceramic comprises yttria stabilized zirconia (YSZ).

* * * * *